United States Patent
Sams et al.

(10) Patent No.: US 11,643,703 B2
(45) Date of Patent: May 9, 2023

(54) METHOD OF RECOVERING ALKALI METALS FROM AN AQUEOUS SOURCE

(71) Applicant: Schlumberger Technology Corporation, Sugar Land, TX (US)

(72) Inventors: Gary W. Sams, Spring, TX (US); Robert Charles William Weston, Berkshire (GB); Ankur D. Jariwala, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 363 days.

(21) Appl. No.: 16/904,686

(22) Filed: Jun. 18, 2020

(65) Prior Publication Data
US 2020/0399735 A1 Dec. 24, 2020

Related U.S. Application Data

(60) Provisional application No. 62/863,060, filed on Jun. 18, 2019.

(51) Int. Cl.
*C22B 3/00* (2006.01)
*C22B 3/02* (2006.01)
*C22B 3/22* (2006.01)
*C22B 26/12* (2006.01)

(52) U.S. Cl.
CPC ............... *C22B 3/02* (2013.01); *C22B 3/22* (2013.01); *C22B 26/12* (2013.01)

(58) Field of Classification Search
CPC .... C25B 1/14; C25B 1/16; C25C 1/02; C25C 1/04; C01D 1/40; C22B 3/26–409; C22B 26/10; C22B 26/12; B01D 11/0415; B01D 11/0419
See application file for complete search history.

(56) References Cited

U.S. PATENT DOCUMENTS

| | | |
|---|---|---|
| 9,034,295 B2 | 5/2015 | Harrison |
| 9,222,149 B2 | 12/2015 | Harrison |
| 9,644,126 B2 | 5/2017 | Harrison et al. |
| 9,650,555 B2 | 5/2017 | Harrison et al. |
| 9,834,449 B2 | 12/2017 | Harrison |
| 9,847,552 B2 | 12/2017 | Dietz et al. |
| 9,988,280 B2 | 6/2018 | Donaldson et al. |
| 9,995,121 B2 | 6/2018 | Harrison |
| 10,190,030 B2 | 1/2019 | Harrison et al. |
| 10,505,178 B2 | 12/2019 | Snydacker et al. |
| 10,604,414 B2 | 3/2020 | Featherstone et al. |
| 10,648,061 B2 | 5/2020 | Cheng et al. |
| 10,648,090 B2 | 5/2020 | Snydacker et al. |
| 10,683,563 B2 | 6/2020 | Harrison et al. |
| 10,695,694 B2 | 6/2020 | Snydacker |
| 2014/0054233 A1 | 2/2014 | Harrison |
| 2016/0129373 A1 | 5/2016 | Sams et al. |
| 2017/0333867 A1 | 11/2017 | Cheng et al. |
| 2018/0147532 A1 | 5/2018 | Switzer et al. |
| 2019/0032227 A1 | 1/2019 | Lipp et al. |
| 2019/0112206 A1 | 4/2019 | Mandewalkar et al. |
| 2019/0256368 A1 | 8/2019 | Marston et al. |
| 2020/0086271 A1 | 3/2020 | Harrison et al. |
| 2020/0140305 A1 | 5/2020 | Liberatore |
| 2020/0165699 A1 | 5/2020 | Snydacker et al. |
| 2020/0189924 A1 | 6/2020 | Featherstone et al. |
| 2020/0189925 A1 | 6/2020 | Featherstone et al. |

FOREIGN PATENT DOCUMENTS

| | | |
|---|---|---|
| CL | 201101857 A | 12/2011 |
| CL | 201402212 A1 | 1/2015 |
| CN | 107253732 A | 10/2017 |
| FR | 2976280 A1 | 12/2012 |
| WO | WO2011133165 A1 | 10/2011 |
| WO | WO 2018-208305 | * 11/2018 |
| WO | WO2019028148 A1 | 2/2019 |
| WO | 2019168941 A1 | 9/2019 |
| WO | 2019213736 A1 | 11/2019 |

OTHER PUBLICATIONS

Search Report and Written Opinion issued in Chilean patent No. 202001650 dated Oct. 18, 2021, 12 pages.

* cited by examiner

*Primary Examiner* — Steven J Bos
(74) *Attorney, Agent, or Firm* — Jeffrey D. Frantz

(57) ABSTRACT

Apparatus and methods for lithium extraction from aqueous sources are described herein. Divalent ions are removed using staged membrane separation. The aqueous source is subjected to a solvent extraction process that extracts lithium. Aqueous and organic phases of streams produced by the solvent extraction process are separated using electrical and/or gas flotation separation. The solvent is de-complexed to unload lithium. Streams produced by the de-complexing may be subjected to electrical and/or gas flotation separation. Solvent de-complexing can be performed using an electrical separator. Aqueous streams are pH adjusted for return to the environment.

15 Claims, 9 Drawing Sheets

METHOD OF RECOVERING ALKALI METALS FROM AN AQUEOUS SOURCE

CROSS-REFERENCE TO RELATED APPLICATIONS

This patent application claims benefit of U.S. Provisional Patent Application Ser. No. 62/863,060 filed Jun. 18, 2019, which is entirely incorporated herein by reference.

FIELD

Embodiments herein generally relate to lithium extraction. Specifically, methods and apparatus are disclosed for recovering lithium from aqueous sources.

BACKGROUND

Lithium is a key element in energy storage. Electrical storage devices, such as batteries, supercapacitors, and other devices commonly use lithium to mediate the storage and release of chemical potential energy as electrical current. As demand for renewable, but non-transportable, energy sources such as solar and wind energy grows, demand for technologies to store energy generated using such sources also grows.

Global lithium reserves are, according to one estimate, about 82.8 MMT (million metric tons) LCE (lithium carbonate equivalents), with China, Argentina, and Chile accounting for some 80% of known global reserves. Current global demand is estimated at 212 kMT, a rate that current global reserves can supply for about 390 years. While global demand has approximately tripled over the last decade, demand for lithium is expected to increase approximately five-fold over the coming decade, with annual increases exceeding 20%. Extraction capacity is currently approximately in balance with demand, and planned investments are estimated to grow extraction capacity to 735 kMT LCE by 2022. With more money being deployed in lithium extraction, new cost-effective technologies are needed to drive growth in use of renewable energy.

Lithium can be extracted from brine sources using an existing solvent extraction technology. A lithium extraction solvent is contacted with a lithium-bearing brine in a pulse column. The solvent and brine counter-flow through the column, and hydraulic pulses are applied to shear the fluids into small domains that intimately contact to extract lithium from the aqueous phase into the organic solvent.

The solvent exiting the pulse column is complexed with lithium. Ultimately, this lithium will be converted to compounds such as lithium carbonate and lithium hydroxide. The lithium-bearing solvent exiting the pulse column often contains co-extracted impurities with entrained and dissolved aqueous phase that can interfere with downstream conversions, so the aqueous components must be substantially removed. A scrubbing tower is conventionally used for this step. The scrubbing tower is also a pulse column with internal structures that separates the organic and aqueous components by liquid-liquid extraction. Sulfuric acid can be injected after the pulse column and before the scrubbing tower to aid in removing the co-absorbed impurities. Other acids may also be used, including hydrochloric acid and nitric acid.

The scrubbed solvent, free of monovalent impurities, is then routed to a stripping column in which the dehydrated solvent is contacted with sulfuric acid to de-complex the lithium to lithium sulfate, which is removed as a solution and/or slurry. The lithium sulfate can then be converted to lithium carbonate or lithium hydroxide, which are two convenient forms of tradable lithium.

The scrubbing and stripping columns have problems of carry-over and carry-under that reduce the separation effectiveness of these facilities. Additionally, towers are difficult to scale up to large volumes because it is not always possible to make a taller tower. Series towers can be used, but the associated piping, valving, and pumps become expensive.

New apparatus and methods of lithium extraction are needed.

SUMMARY

Embodiments described herein provide an apparatus, comprising a solvent contactor having a brine inlet at a first end of the solvent contactor, a solvent inlet at a second end of the solvent contactor opposite from the first end, a loaded solvent outlet at the first end of the solvent contactor, and a brine outlet at the second end of the solvent contactor; an electrical separator comprising a vessel fluidly coupled to the loaded solvent outlet, the vessel having an electric field assembly disposed in an interior thereof and electrically coupled to a time-varying voltage power unit, a loaded solvent outlet in an upper portion thereof, and a brine outlet in a lower portion thereof; and an extractor fluidly coupled to the loaded solvent outlet of the electrical separator, the extractor having a loaded solvent inlet, an unloaded solvent outlet, and a slurry outlet, with a sulfuric acid source coupled to the extractor.

Other embodiments described herein provide an apparatus, comprising a solvent contactor having a brine inlet at a first end of the solvent contactor, a solvent inlet at a second end of the solvent contactor opposite from the first end, a loaded solvent outlet at the first end of the solvent contactor, and a brine outlet at the second end of the solvent contactor; and an electrical separator arranged to treat loaded solvent from the solvent contactor, the electrical separator having an electrode disposed in an interior of a separation vessel and electrically coupled to a time-varying voltage power unit, a loaded solvent outlet in an upper portion of the separation vessel, and a brine outlet in a lower portion of the separation vessel.

Other embodiments described herein provide a method of recovering alkali metals from an aqueous source, comprising removing divalent ions from the aqueous source by subjecting the aqueous source to a first membrane filtration process that produces a first permeate stream and a reject stream, routing the reject stream to a second membrane filtration process that produces a second permeate stream and a concentrated divalent stream, and combining the first and second permeate streams to produce a divalent depleted stream; contacting the divalent depleted stream with an organic solvent that complexes alkali metals and recovering a loaded solvent stream and a depleted brine stream; and de-complexing the loaded solvent of the loaded solvent stream in the presence of a time-varying electric field to form an aqueous stream and an unloaded solvent stream.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
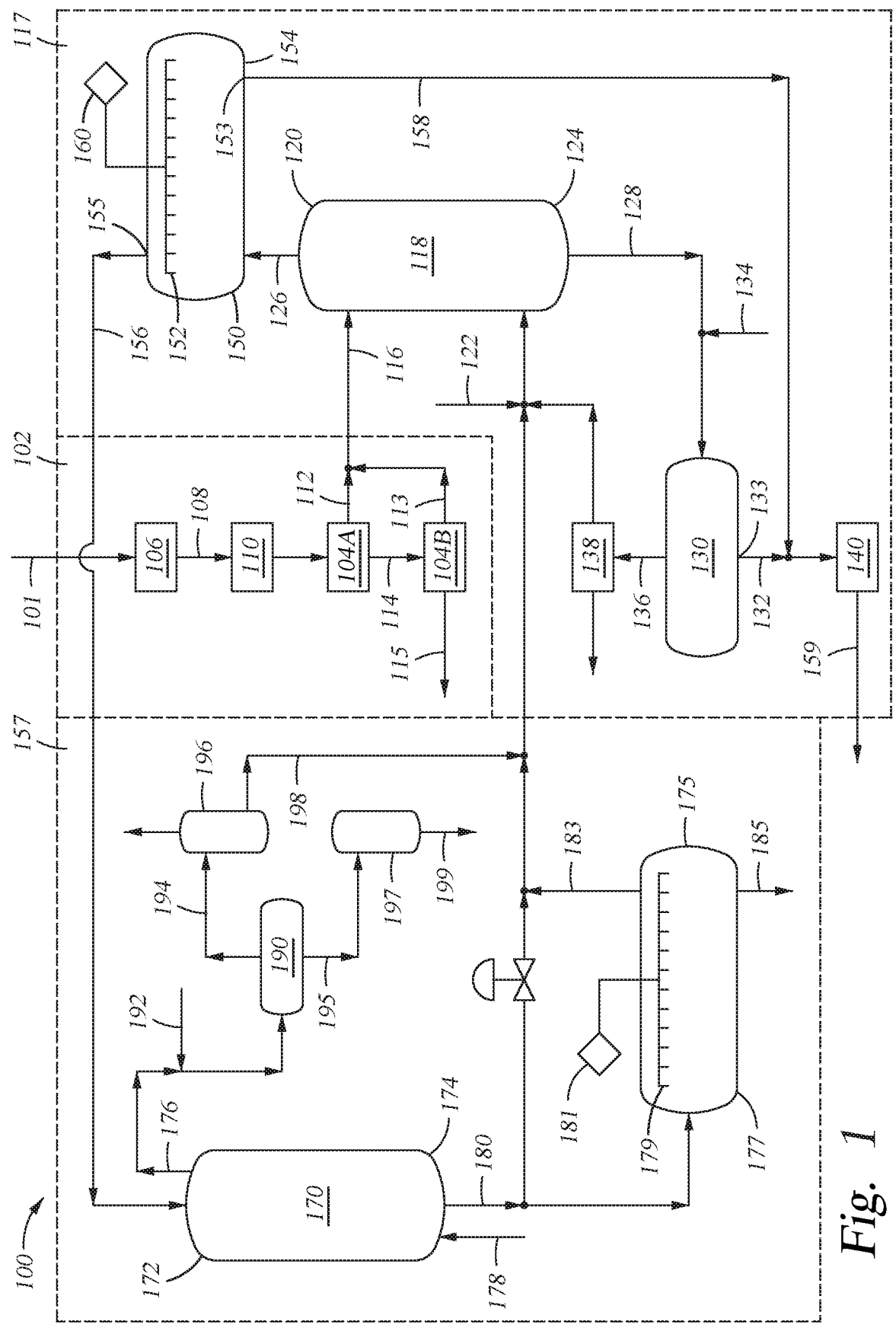
FIG. 1 is a process diagram of a lithium extraction apparatus according to one embodiment.

The lithium extraction methods and apparatus described herein are designed to have minimal impact on the environment. FIG. 1 is a process diagram of a lithium extraction apparatus 100 according to one embodiment. The lithium extraction apparatus 100 removes lithium ions from an aqueous source, and returns an environmentally benign aqueous medium to the environment. The aqueous lithium source can be a salar brine, such as a salar lake, a mine wash, seawater, geothermal source, pretreated brine from a petro-lithium source, or other aqueous lithium source. The aqueous lithium is charged to a divalent removal section 102 to remove divalent ions such as alkaline earth metal ions.

The divalent removal section 102 includes one or more membrane separators 104 that selectively filter divalent ions from an aqueous feed stream 101. The membrane separators 104 may be any combination of microfiltration, ultrafiltration, nanofiltration, and reverse osmosis units. The feed stream 101 may be subjected to a first rough filtration or settling process in a pre-filtration unit 106 to remove any undissolved solids. A pre-filtered stream 108 exits the optional pre-filtration unit 106. Alternately, the feed stream 101 can be provided directly to the membrane separators 104. In some cases, the stream charged to the membrane separators is pressurized to facilitate separation. For example, in some reverse osmosis processes, particularly where high selectivity is employed to maximize recovery of lithium, the stream charged to the reverse osmosis unit may be pressurized to a pressure exceeding 1,000 psi. A pumping stage 110, which may have multiple pumps in series, is typically used to raise the pressure of the stream for passing to the reverse osmosis unit.

An electric potential may be applied to one or more of the membrane separators 104 to increase separation selectivity. For example, a cathode may be disposed on one side of a filtration surface of a membrane separator while an anode is disposed on an opposite side of the filtration surface. Powering the cathode or the anode provides an electric field between the cathode and the anode that provides additional energy to the system to separate divalent ions. The electric field can increase selective permeability of monovalent ions relative to that of divalent ions, increasing the yield of monovalent ions, such as lithium, in the membrane separator 104.

Each of the membrane separators 104 produces a permeate stream and a reject stream. In this case, two membrane separators 104 are arranged in series. A first membrane separator 104A produces a first permeate stream 112 and a first reject stream 114. The first reject stream 114 is routed to a second membrane separator 104B. The second membrane separator 104B produces a second permeate stream 113 and a second reject stream 115, which is a concentrated divalent stream. Using standard divalent membrane technology, the two membrane separators 104A and 104B selectively remove divalent ions from the pre-filtered stream 108.

In one case, a stream containing brine that is 200 ppm lithium is passed through a first membrane separator to produce approximately equal volumes of permeate and reject streams. Brine in the permeate stream has 350 ppm lithium, while brine in the reject stream has 50 ppm lithium. Thus, lithium, and other monovalent ions, have selectively permeated the membrane while divalent ions have been selectively rejected. The reject stream from the first membrane separator is provided to a second membrane separator, which again produces approximately equal permeate and reject volumes. Brine in the permeate stream of the second membrane separator has 80 ppm lithium while brine in the reject stream of the second membrane separator has 20 ppm lithium. The two permeate streams are combined to form a divalent depleted stream, where the brine in the divalent depleted stream has about 260 ppm lithium. The two membrane separators together recover 97.5% of the lithium in the original feed stream. If selectivity is defined as lithium yield divided by lithium rejection, the selectivity of the above arrangement to lithium is about 40.

The divalent depleted stream 116 is subjected to a solvent extraction process to remove lithium. The solvent most commonly used for lithium extraction from aqueous media is CYANEX 936®, a solvent that is not miscible with water, but chelates lithium from an aqueous phase. CYANEX 936® is available from Solvay S.A. of Brussels, Belgium. The solvent extraction process is performed in an extraction section 117. The divalent depleted stream 116 is provided to a contactor 118 in the extraction section 117 where intimate contact with the extraction solvent is performed. The divalent depleted stream 116 is provided to a first end 120 of the contactor 118 while a solvent stream 122 containing the lithium extraction solvent is provided to a second end 124 of the contactor 118, thus performing a counter-current liquid-liquid extraction. A loaded solvent stream 126 is removed at the first end 120 of the contactor 118 while a lithium-depleted aqueous stream 128 is removed at the second end 124 of the contactor 118. The loaded solvent stream 126 is solvent complexed with lithium ions. The contactor 118 is a high shear vessel that shears the solvent phase into very small domains that intimately contact the aqueous phase.

In one embodiment, the contactor 118 is a pulse column that comprises a plurality of parallel trays disposed throughout the column at regular intervals. A hydraulic impulse source is fluidly coupled to the column interior to provide a hydraulic pulse to the fluid flowing through the column. Differences in density of the aqueous and non-aqueous phases result in different effect of the hydraulic pulse on the two phases, giving rise to very high instantaneous shear rates as the pulse propagates through the fluid column. The shear maintains very small domains of the solvent phase in the aqueous phase. The pulse column is a technology available from Tenova S.p.A. of Gerenzano, Italy.

Figure 2A:
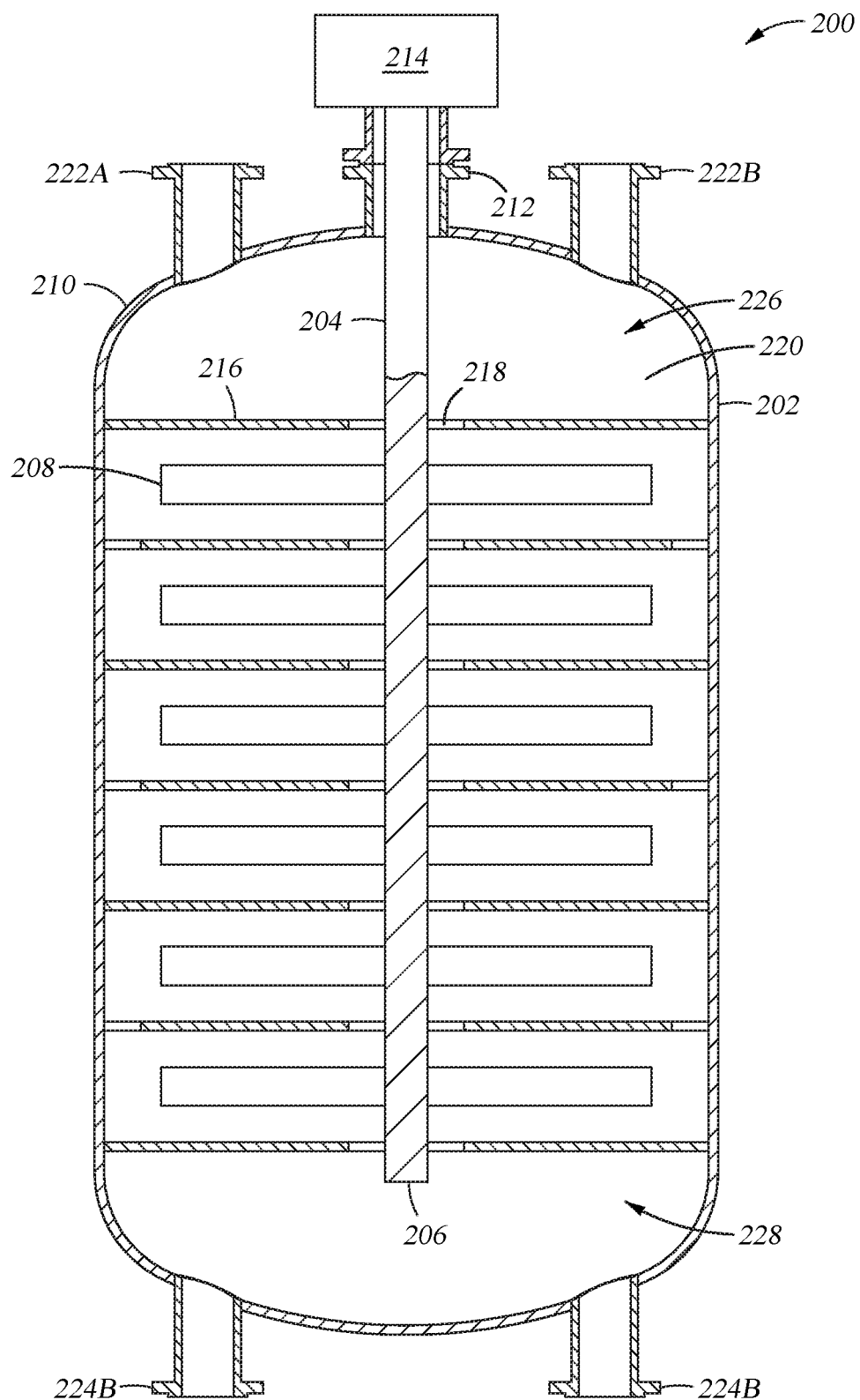
FIG. 2A is a cross-sectional diagram of a rotary contactor according to one embodiment for use in contacting processes in the apparatus of FIG. 1.

In another embodiment, a rotary contactor may be used instead of a pulse column. The rotary contactor is a drum or tower that has a plurality of rotating discs or trays, which may have holes in them. FIG. 2A is a cross-sectional diagram of a rotary contactor 200 that may be used as the contactor 118 of FIG. 1. The rotary contactor 200 includes a vessel 202 and a rotary member 204. The rotary member 204 includes a shaft 206 and a plurality of agitators 208 attached to the shaft 206. The agitators 208 may be discs or blades extending radially outward from the shaft 206, and may be pitched or shaped in any desired way. The agitators 208 generally shear the fluid substantially without pumping the fluid. The shaft 206 extends along a longitudinal axis of the vessel 202, and the agitators 208 extend generally transverse to the axis of the vessel 202. The shaft 206 extends through an upper wall 210 of the vessel 202. Here, the shaft 206 is disposed through a flange 212 located at a central area of the upper wall 210. Rotary seals prevent leakage around the rotatable shaft 206. A motor 214 drives rotation of the shaft 206. The motor 214 can be mounted to the flange 212 or spaced apart therefrom.

The vessel 202 contains dividers 216 disposed in an interior of the vessel 202. The dividers 216 are plate-like members oriented transverse to the longitudinal axis of the vessel 202 and extending from the wall of the vessel 202 to the center thereof. The shaft 206 extends through the dividers 216 from the upper wall 210 to a lower portion of the vessel 202. The dividers 216 create contacting chambers 220 within the vessel 202. The dividers 216 have openings 218 that allow fluid to flow from one chamber 220 to an adjacent chamber 220 for counter-current operation of the contactor 200. Here, a plurality of dividers 216 create a plurality of chambers 220, but other embodiments might use only one divider 216. Each agitator 208 is disposed in one of the chambers 220 to provide shear to the fluid within the chamber 220. The fluid in one chamber 220 generally communicates with the fluid in adjacent chambers 220.

The vessel 202 has two upper ports 222A and 222B and two lower ports 224A and 224B. Each pair of ports operates as an inlet and an outlet. That is to say, upper port 222A is an inlet while upper port 222B is an outlet. Likewise, lower port 224A is an inlet while lower port 224B is an outlet. When used as the contactor 118, the divalent depleted stream 116 is provided to the upper port 222A and the solvent stream 122 is provided to the lower port 224A. The loaded solvent stream 126 is withdrawn through the upper port 222B and the lithium-depleted aqueous stream 128 is withdrawn through the lower port 224B. The vessel 202 has an upper settling region 226 located above the uppermost divider 216 that allows settling of the aqueous phase and the organic phase so that the organic phase can be withdrawn through the upper port 222B with minimal intrusion of the aqueous phase still bearing lithium. The upper ports 222A and 222B may be strategically located to minimize aqueous carry-over from the contactor 200. The vessel 202 also has a lower settling region 228 located below the lowermost divider 216 for settling the lithium-depleted aqueous phase. The lower settling region 228 minimizes carry-under of solvent with lithium-depleted aqueous fluid.

Figure 2B:
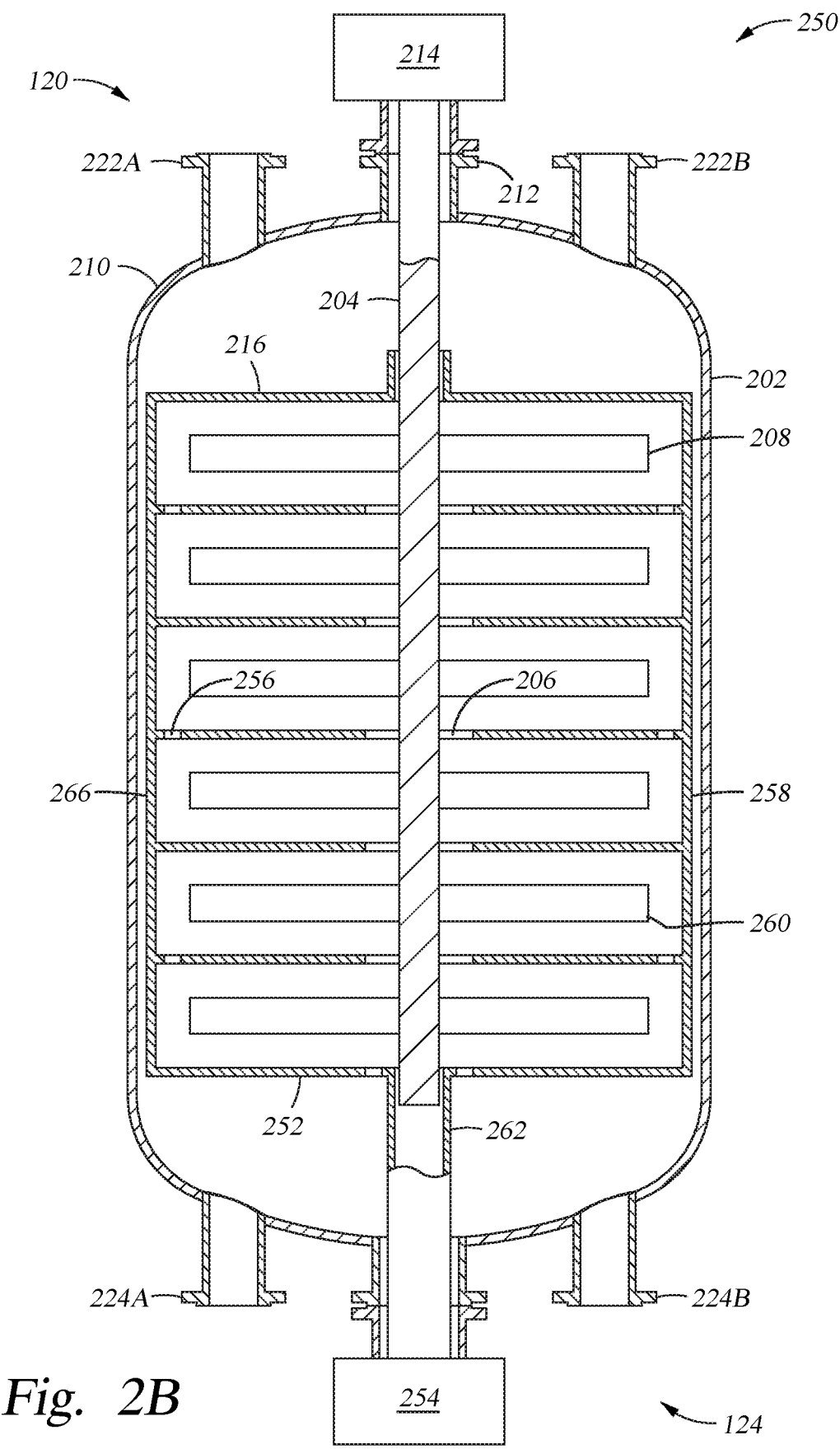
FIG. 2B is a cross-sectional diagram of a rotary contactor according to another embodiment for use in contacting processes in the apparatus of FIG. 1.

FIG. 2B is a cross-sectional view of a rotary contactor 250 according to another embodiment. The rotary contactor 250 features counter-current contacting with counter-rotating agitators. Here, the rotary member 204 is a first rotary member, and the rotary contactor 250 also has a second rotary member 252. The second rotary member 252 features a cylindrical portion 266 coupled to a motor 254 by a shaft 262. The motor 214 coupled to the first rotary member 204 is located at the first end 120 of the rotary contactor 250 and is a first motor. The first motor 214 is coupled to the shaft 206, which is a first shaft. The motor 254 is a second motor and is located at the second end 124 of the rotary contactor 250. The second rotary member 252 has a second shaft 262 that couples the second rotary member 252 to the second motor 254. The first and second motors 214 and 254 are located at opposite ends of the rotary contactor 250 to avoid interfering with each other.

The second rotary member 252 has a plurality of extensions 256 that extend inward, for example radially inward, from the cylindrical portion 266 toward a central region of the vessel 202. The extensions 256 extend toward the first shaft 204, but do not contact the first shaft 204, enabling the first shaft 204, and thus the first rotary member 204 to move independently from the second rotary member 252. The cylindrical portion 266 of the second rotary member 252 is located near the side wall of the vessel 202. The extensions 256 extend toward the first shaft 206 between the agitators 208, such that the agitators 208 are free to move independently and unimpeded between the extensions 256. Because the first and second rotary members 204 and 252 do not contact one another, the first and second rotary members 204 and 252 can counter-rotate, with the first rotary member 204 rotating in a first direction and the second rotary member 252 rotating in a second direction opposite to the first direction, thus increasing shear of the fluids in the vessel 202.

The extensions 256 may be blades, discs, baffles, or other structures that extend inward from the cylindrical portion 266. Although not shown here, the extensions 256 may be plate-like structures with upwardly-extending or downwardly-extending features to provide further mixing and/or shear. The extensions 256 are represented here as solid members with openings 260 to facilitate fluid flow along the axial direction of the vessel 202. The extensions 256 have an outer edge 258 that defines a gap with an internal surface of the cylindrical portion 266. In other embodiments, all or part of the second rotary members 252 may be made of a mesh material that passes through the fluids and provides shear as the mesh passes through the fluids. In some embodiments, all or part of the agitators 208 can also be made of mesh material.

In all the embodiments of contactors 118 described herein, net flow of aqueous medium is from the first end 120 to the second end 124, while net flow of solvent is from the second end 124 to the first end 120. The general flow of lithium-free solvent into the second end 124 and lithium-bearing aqueous media into the first end 120 results in a counter-current solvent extraction process where lithium concentration generally changes with altitude in the contactor 118, producing an efficient extraction of lithium from the aqueous phase into the solvent phase.

Referring again to FIG. 1, the extraction section 117 includes a first separator 130 and a second separator 150. The lithium-depleted aqueous stream 128 from the contactor 118 is provided to the first separator 130 to remove residual solvent from the aqueous stream 128. In this case the first separator 130 is a gas flotation separator that uses gas to enhance separation of a low-density fluid from a high-density fluid by gravity. A gas stream 134 is added to the aqueous stream 128 prior to flowing the aqueous stream 128 into the first separator 130. The gas rises in the first separator 130, providing enhanced separation velocity for the discrete solvent domains dispersed in the aqueous domain. Solvent and gas are recovered in a solvent stream 136 removed from an upper region of the first separator 130, while a clean brine stream 132 is recovered from a brine outlet 133 at a lower region of the first separator 130. The solvent stream 136 is provided to a gas scrubber 138, fluidly coupled to the brine outlet 133, where gas is removed from the solvent. The solvent recovered in the gas scrubber 138 is returned to the solvent stream 122 en route to the contactor 118. Examples of gas flotation separators that can be used here include the WEMCO® Depurator™, the TST-CFU™ flotation unit, the EPCON Dual Compact Flotation Unit, the WEMCO® ISF unit, or the UNICEL vertical induced gas flotation unit, all available from Schlumberger, Ltd., of Houston, Tex.

In some cases, the gas flotation separator includes two stages of separation with a pressure drop in between. A flotation gas may be added to a stream to be separated, and the mixture provided to a first separation stage to allow the gas to facilitate separation in the first stage. The high density stream obtained, with much of the low density material removed, is then passed through a pressure drop device, such as a valve or orifice, to reduce the pressure of the stream and form gas bubbles. The lower pressure stream with gas bubbles is then provided to a second separation stage to undergo a second flotation separation. Here, the stream being separated in two stages, with pressure drop in between, is a lithium-depleted brine stream that may have some entrained and dissolved solvent.

If further reduction of dissolved organics in the clean brine stream 132 is desired, the clean brine stream 132 can be passed through a first filtration unit 140 fluidly coupled to the brine outlet 133. The first filtration unit 140 has an oleophilic filter material, such as an Optipore™ media from Dow Chemical of Midland, Mich., or a filter media from MyCelx Technologies Corp. of Duluth, Ga. A filtered clean brine stream 159 exits the first filtration unit 140. Additionally, a membrane process can be used The second stripper 150 is a dehydrator that removes residual aqueous material from the loaded solvent stream 126. The loaded solvent stream 126 is moved to the dehydrator 150, which is fluidly coupled to the loaded solvent stream 126. The dehydrator 150 of FIG. 1 is an electrical separator that uses an electric field to enhance separation of separable liquid phases in a mixture. Here, the mixture is an organic solvent with entrained and dissolved aqueous material. The loaded solvent stream 126 is provided to a lower portion of the dehydrator 150. The dehydrator 150 has an electric field assembly 152 disposed in a vessel 154. The electric field assembly 152 can be disposed in an upper region or middle region of the vessel 154. As the loaded solvent stream 126 enters the vessel 154, the solvent stream rises toward a solvent outlet and exits as a dehydrated solvent stream 156 at an upper region of the vessel 154. The solvent stream encounters the area of the electric field assembly 152, where an electric field affects charge distribution at the surface of aqueous domains and applies electrostatic forces to aqueous polar molecules in the solvent stream. The electrostatic forces increase coagulation rate of aqueous domains and molecules, which are denser than the organic phase. When the weight of the aqueous domains overcomes any flow impetus from the rising solvent stream, the aqueous domains fall to the lower region of the vessel 154 and coagulate at the bottom thereof. The second separator 150 has a brine outlet 153 at a bottom thereof and a solvent outlet 155 in an upper region thereof. An aqueous brine stream 158 is withdrawn from brine outlet 153 the bottom of the vessel 154, and may be combined with the clean brine stream 132 for filtration in the first filtration unit 140. Alternately, for maximum solvent recovery, the aqueous brine stream 158 may be combined with the lithium-depleted aqueous stream 128 prior to gas injection for gas flotation separation in the first gas flotation separator 130.

The electrical separator 150 includes one or more power units 160, which are coupled to the electric field assembly 152 to create the electric fields inside the vessel 154. Here the power unit 160 is a DC power unit, which may be pulsed or modulated between two or more static voltage levels. Alternately, an AC power can applied to the electrode, for example using a transformer or other power source. The power unit 160 may be configured to apply different voltages, duty cycles, frequencies, and waveforms, as AC power, DC power, or AC/DC power to the electrode to accelerate separation in the vessel. It should be noted that the electric field assembly 152 may include a plurality of electrodes that are electrically isolated within the vessel 154. Each electrode may be electrically coupled to one or more power units, such as the power unit 160, and each power unit 160 may be coupled to one or more electrodes of the electric field assembly 152. The power units may apply the same power pattern to the various electrodes, or different power patterns to different electrodes. Application of power to the various electrodes may be adjusted based on separation efficiency of the dehydrator 150. For example, aqueous components may be analyzed in the dehydrated solvent stream 156, and operation of the dehydrator 150 may be adjusted to minimize aqueous content of the dehydrated solvent stream 156. In most cases, an electrical separator can reduce the aqueous content of an organic stream to 20 ppm or less.

Lithium is next de-complexed from the dehydrated solvent stream 156 in a de-complexing section 157. The dehydrated solvent stream 156 is contacted with sulfuric acid in an extractor 170. The sulfuric acid is a de-complexing agent that breaks the lithium-solvent complex and produces lithium sulfate. In this case, the extractor 170 is a stripping column in which the dehydrated solvent stream 156 is provided to a first end 172 of the column and the sulfuric acid is provided as an aqueous sulfuric acid stream 178 (i.e. sulfuric acid) to a second end 174 of the column opposite from the first end 172. The sulfuric acid and dehydrated solvent flow in counter-current through the column, and where the aqueous and organic phases contact, sulfuric acid reacts with the lithium-organic complex to produce lithium sulfate in the aqueous phase flowing from the second end 174 to the first end 172 as a solution and/or slurry. An aqueous lithium sulfate stream 176, which is a stream resulting from decoupling lithium from a lithium containing solvent stream using an acid, is withdrawn from the first end 172 of the extractor 170. A unloaded solvent stream 180 is withdrawn at the second end 174 of the extractor 170. The unloaded solvent stream 180 can be recycled to the contactor 118 after appropriate purification. The extractor 170, in this case, is a column, but other types of contacting apparatus can be used also. For example, rotary contactors as described above can be used. Electrical separators, with or without contacting structures, can also be used, as further described below.

The lithium sulfate stream 176 may include some entrained or dissolved solvent. A third separator 190 can be used to separate and recover the trace solvent. In this case, the third separator 190 is a second gas flotation separator, but other types of liquid separators, such as filter-coalescers, media separators, and corrugated plate vessels may be used.

Similar to the first gas flotation separator 130, a flotation gas stream 192 is added to the lithium sulfate stream 176 and the mixture is provided to the second gas flotation separation 190. Solvent is encouraged to rise and exit as a recovered solvent stream 194 from an upper portion of the second gas flotation separator 190. The recovered solvent stream 194 can be provided to a second gas scrubber 196 where a recycle solvent stream 198 is recovered, which may be routed to the contactor 118 for extraction along with the solvent stream 122. In this way, the solvent stream 122 can be a make-up solvent stream that compensates for losses in the solvent loop of the apparatus 100. A clean lithium slurry stream 195 is recovered from a lower portion of the second gas flotation separator 190. If further organic removal from the lithium slurry stream 195 is desired, the lithium slurry stream 195 may be provided to a second filtration unit 197 similar to the first filtration unit 140, where an oleophilic material removes trace organics. A clean lithium slurry stream 199 is withdrawn and routed for further processing. Typically, the clean lithium slurry stream 199 is subjected to electrolysis to convert the lithium sulfate to lithium hydroxide. Sulfuric acid is formed again in the process, and may be recycled to the de-complexing section 157.

When the extractor 170 is a column, aqueous material can exit the second end 174 of the column with the unloaded solvent stream 180. A fourth separator 175 can be used to separate aqueous and organic components of the unloaded solvent stream 180 if needed. The fourth separator 175 will be a dehydrator to remove aqueous material from a continuous organic phase, so the fourth separator will have a vessel 177 with electric field assembly 179 disposed therein and a power source 181 electrically coupled to the electric field assembly 179, similar to other embodiments described herein. A dehydrated unloaded solvent stream 183 is withdrawn from an upper portion of the vessel 177, and can be returned to the extraction section 117 and blended with the solvent stream 122 for use in the contactor 118. An aqueous stream 185, resulting from separation of residual aqueous components of the unloaded solvent stream 180, is withdrawn from a lower portion of the vessel 177.

The lithium extraction apparatus 100 may be operated without the first and second gas flotation separators 130 and 190, and their associated gas scrubbers 138 and 196 and filtration units 140 and 197. The lithium extraction apparatus 100 may also be operated with only one of the first and second gas flotation separators 130 and 190, with respective gas scrubbers 138/196 and filtration units 140/197. That is to say, the lithium extraction apparatus 100 may be operated with the first gas separator 140 and the electrical separator 150, or with the electrical separator 150 and the second gas separator 190.

Figure 3:
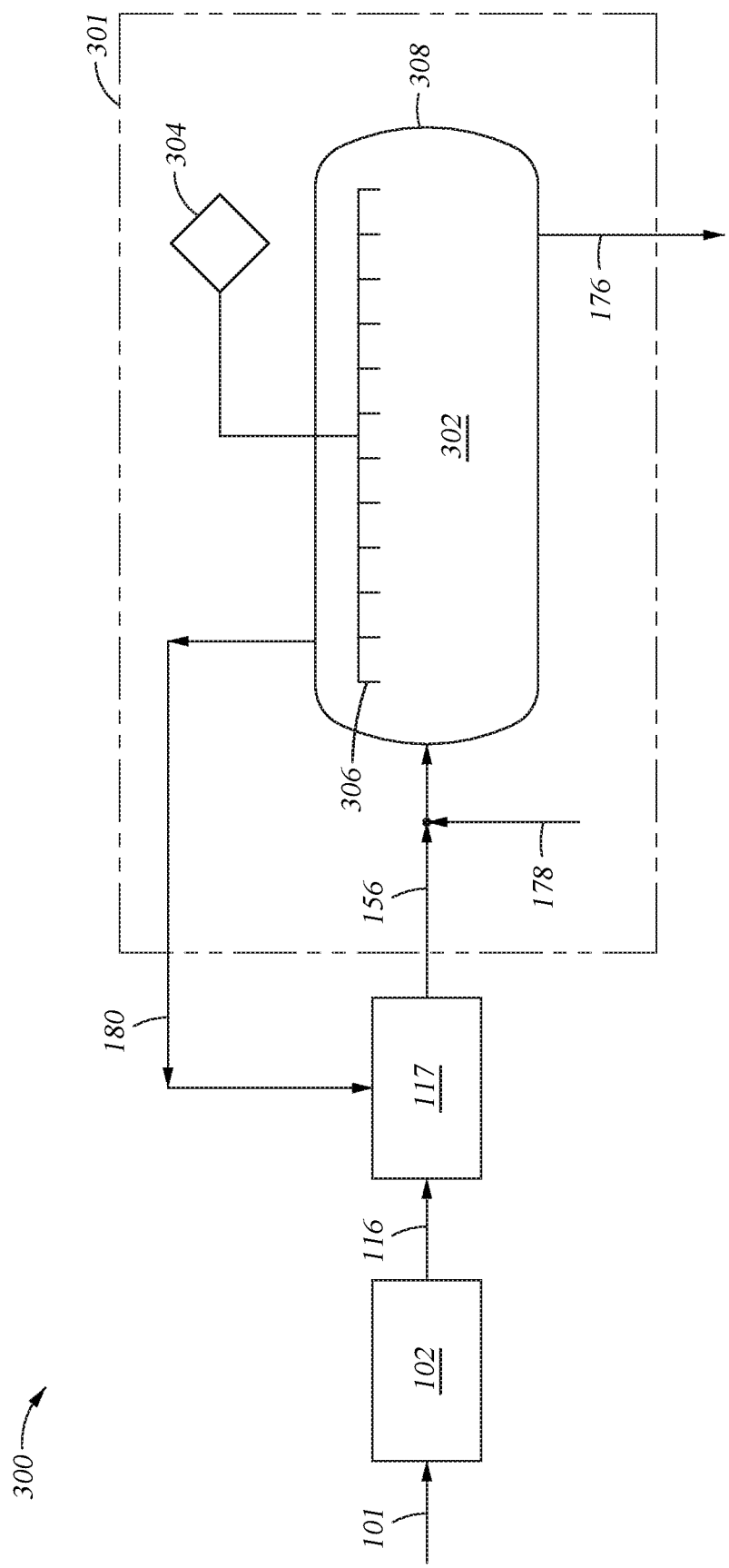
FIG. 3 is a process diagram of a lithium extraction apparatus according to another embodiment.

FIG. 3 is a process diagram of a lithium extraction apparatus 300 according to another embodiment. The lithium extraction apparatus 300 is similar to the lithium extraction apparatus 100 of FIG. 1, including the divalent removal section 102 and the extraction section 117. The lithium extraction apparatus 300 differs from the lithium extraction apparatus 100 in the de-complexing section. The lithium extraction apparatus 300 has a de-complexing section 301 coupled to the extraction section 117. The de-complexing section 301 includes a fourth separator 302 as the extractor 170 of FIG. 1. The fourth separator 302 is an electrical separator with an electric field assembly 306 disposed in a vessel 308. Whereas the column embodiment of the extractor 170 operates using a continuous aqueous phase, the fourth separator 302 does not use a continuous aqueous phase. The result is that aqueous phases obtained from the fourth separator 302 are much more concentrated in lithium than those obtained from the pulse column. In some cases, the concentration of lithium sulfate obtained from an electrical vessel used for de-complexing can be as much as 10 to 20 times higher than that obtained using the column, resulting in less processing needed to concentrate lithium afterward.

A power source 304 is coupled to the electric field assembly 306. Here, a DC power source is shown, but the power source 304 may be an AC power source, a DC power source, or an AC/DC power source. As with the second separator 150, the power source 304 may supply constant voltage or time-varying voltage to the electric field assembly 306. The time-varying voltage may be AC, which may be provided at a variety of frequencies and voltages, using a variety of waveforms. The time-varying voltage may also, or alternately, be a pulsed or modulated DC voltage, which can vary in duty cycle, frequency, and modulated voltage levels.

For the de-complexing section 301, the sulfuric acid stream 178 is added to the dehydrated solvent stream 156 before flowing into the vessel 308, at a location upstream of an inlet of the vessel 308, for example using a mixer or plurality of mixers. Static mixers, jet mixers, and combinations thereof may be used to mix the sulfuric acid stream 178 intimately with the dehydrated solvent stream 156. As noted above, the reaction produces lithium sulfate, which flows with the two liquid phases to form a three-phase fluid that flows into the vessel 308.

In the vessel 308, an electric field, which may be time-varying as described above, is applied to the three-phase fluid. The lithium sulfate solids descend to a lower portion of the vessel 308, and the electric field encourages the two liquid phases to separate into an aqueous phase and an organic phase. The organic phase is delithiated solvent, while the aqueous phase is a sulfuric acid stream. The lithium sulfate collects in the aqueous phase at the bottom of the vessel 308.

The unloaded solvent stream 180 is withdrawn from an upper portion of the vessel 308, while the aqueous lithium sulfate stream 176 is withdrawn from a lower portion of the vessel 308. As with the apparatus 100, the unloaded solvent stream 180 can be recycled to the extraction section 117. Here, the separator 302 is controlled to optimize separation of the aqueous and organic phases, resulting in improved separation relative to the column embodiment of the extractor 170. In such cases, further separation, such as by gas flotation as in the apparatus 100, may not be needed and the unloaded solvent stream 180 can be immediately reused without further processing.

The separator 302 is additionally advantageous with respect to the column embodiment because the separator 302 can be more easily scaled. The vessel 308 can be made longer, if necessary, or wider, and more electrodes and power units can be added to add substantially arbitrary amounts of capacity to the single separator 302. Instead of having to make taller columns, or provide multiple columns with attendant piping, pumps, and valves.

One embodiment of an electrical separator that can be used to remove the various aqueous materials described herein from the organic solvents used in these processes uses a 40 KV power unit with a voltage rectifier to deliver a 56 KVDC voltage to an electric field assembly comprising one or more electrodes disposed inside a separation vessel. The fluid is flowed vertically past and between the electrodes, which also extend vertically inside the vessel. The aqueous droplets dispersed in the organic phase undergo electrophoretic coalescence driven by charge distributions on the surfaces of the droplets that are created by the electric fields established between the electrodes. Flow through the vessel, and between the electrodes, can be adjusted to allow for more or less separation time to adjust separation quality. In some cases, such arrangements can bring levels of dispersed aqueous material in an organic phase to 10 ppmv or below.

Separation can be further enhanced in such an embodiment by modulating the DC voltage field. The modulation can be an on/off modulation, that is a modulation between 56,000 volts and zero volts, or between 56,000 volts and one or more non-zero voltage levels. For example a modulation between 56 KVDC and 28 KVDC, a 50% modulation of voltage, or a modulation between 56 KVDC and 40 KVDC, an approximately 30% modulation, can be used. Such modulations can be combined so that modulation patterns are applied in cycles, or random modulations can be applied. Duty cycle of the DC modulations can also be varied, either randomly or according to a pattern. The duty cycle modulations can relate to the voltage modulations, or may be independent. For example, duty cycle can change according to a modulation pattern at the same time that voltage changes, or between voltage changes. The modulation patterns referred to above can relate to process conditions such as flow rate, temperature, pressure, and composition. For example, magnitude and frequency of voltage modulations can increase with increasing aqueous content of the fluid being separated. In some cases, amount of aqueous material remaining in the organic phase can be sensed using, for example, a conductivity sensor, and modulations adjusted accordingly. For example, the DC voltage can be changed, or the voltage modulation can be changed, or the duty cycle can be changed, or the duty cycle modulation can be changed, and the aqueous content response measured. A controller can be configured to seek improved separation using feedback methods.

An example of an electrical separator that could be used as any or all the electrical separators 150, 175, and 302 is the DC Metercell separator available from Schlumberger, Ltd., of Houston, Tex.

Figure 4:
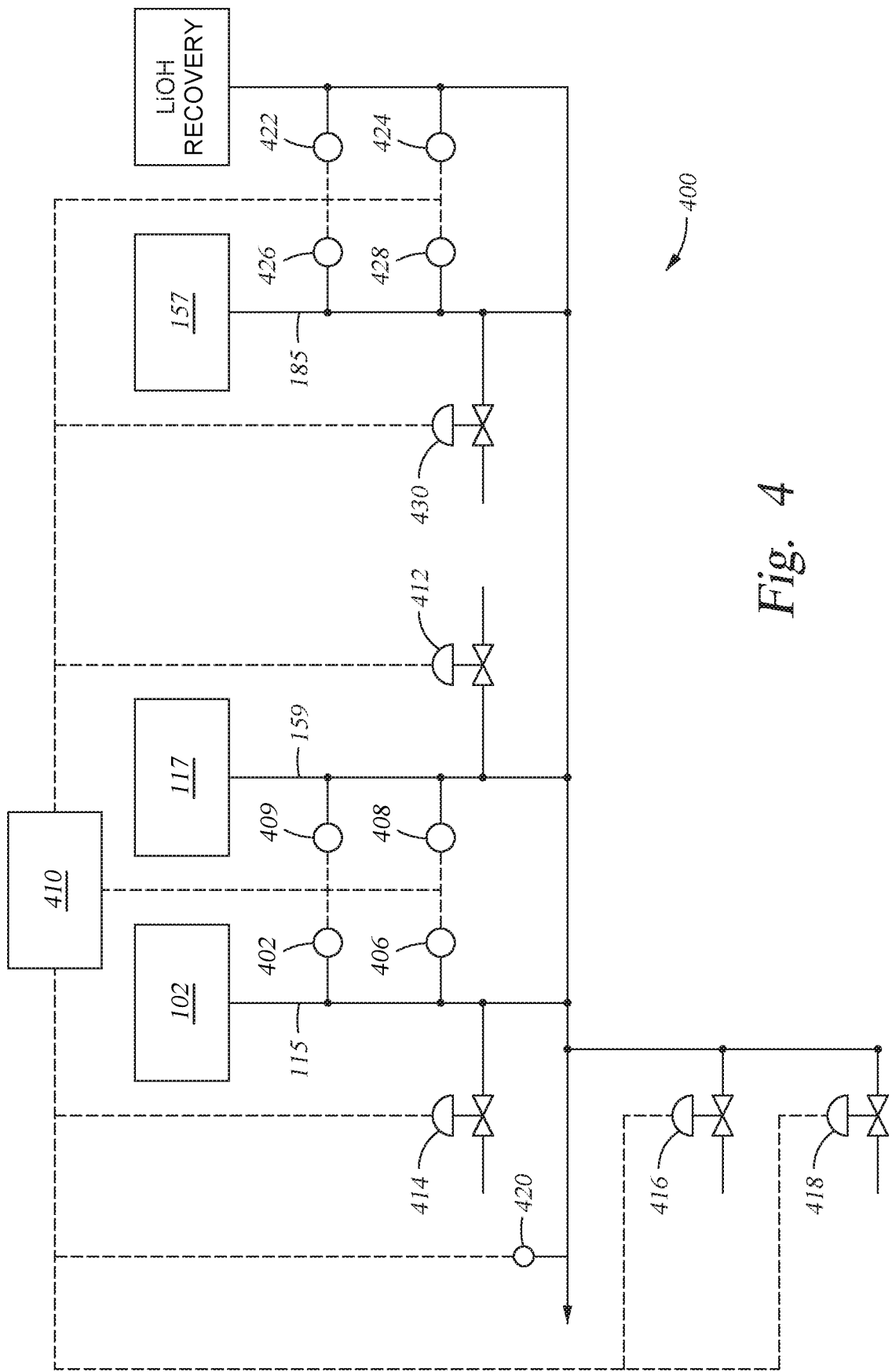
FIG. 4 is a schematic process diagram of a water treatment system for use with the apparatus of FIG. 1 or FIG. 3 according to one embodiment.

FIG. 4 is a schematic process diagram of a water treatment system 400 according to one embodiment. The lithium extraction apparatus 100 and 300 described herein produce lithium-depleted aqueous streams that, if properly composed, can be returned to the environment. The water treatment system 400 adjusts composition of the lithium-depleted aqueous streams so they can be returned to the environment. Referring again to FIG. 1, the divalent removal section 102 produces concentrated divalent stream 115 obtained in this case from the second membrane separator 104B. The extraction section 117 produces a lithium-depleted aqueous brine stream 158 that can be returned to the environment if residual organic species are removed in the first filtration unit 140. In such cases, the filtered clean brine stream 159 can be returned to the environment or used to condition other streams for return to the environment. Also, as noted above, conversion to lithium hydroxide also produces a sulfuric acid stream that can be reused in the de-complexing sections 157 and 301. The sulfuric acid stream can also be conditioned for return to the environment or used to condition other streams for return to the environment.

The water treatment apparatus 400 of FIG. 4 treats any or all of the above streams with pH adjustment additives to condition the streams for return to the environment. The water treatment apparatus 400 of FIG. 4 can be used with the apparatus 100 and with the apparatus 300. A first pH sensor 426 and first flow sensor 428 are coupled to the aqueous stream 185 recovered from the de-complexing section 157. A second pH sensor 409 and a second flow sensor 408 are coupled to the filtered clean brine stream 159 recovered from the extraction section 117. A third pH sensor 402 and a third flow sensor 406 are coupled to the concentrated divalent stream 115 recovered from the divalent removal section 102. A first pH adjustment is applied to the aqueous stream 185 by a first pH adjustment control valve 430. The first pH adjustment may be a sulfate buffer material to increase pH in the event the aqueous stream is a low pH sulfate solution. A second pH adjustment is applied to the filtered clean brine stream 159 by a second pH adjustment control valve 412. The second pH adjustment may be an acidic material to lower pH of the filtered clean brine stream 159. The acidic material can be any of the sulfuric acid streams described herein.

In the event the aqueous stream 185 is low pH and the filtered clean brine stream 159 is high pH or merely elevated pH, the streams 185 and 159 will at least partially neutralize each other. However, if the pH values of the two streams are far apart, a strong reaction can take place. The first and second pH adjustments, applied by the control valves 412 and 430, can reduce the difference between the pH values of the two streams so that the neutralization that occurs is milder.

A third pH adjustment is applied to the concentrated divalent stream 115 by third pH adjustment control valve 414. The third pH adjustment may be a buffer material to raise pH of the concentrated divalent stream 115. In the event aqueous streams are recovered from downstream processes such as LiOH recovery and blended with the aqueous stream 185, the filtered clean brine stream 159, and the concentrated divalent stream 115, a fourth pH sensor 422 and fourth flow sensor 424 can be coupled to the downstream recovered aqueous stream.

A controller 410 is coupled to the pH sensors 426, 404, 402, and 422, to the flow sensors 428, 408, 406, and 424, and to the pH adjustment control valves 430, 412, and 414. The controller 410 is configured to determine set points of the pH adjustment control valves to achieve an overall objective for returning the combined streams to the environment. The controller 410 determines an amount of pH adjustment to apply to each stream, which may include completely neutralizing each stream or bringing each stream to a non-neutral pH target if in-situ neutralization is to be utilized. A final pH sensor 420 may be coupled to the combined return stream prior to release into the environment. A pH reduction adjustment 416 and a pH increase adjustment 418 can be coupled to the combined return stream as well. The final pH sensor, pH reduction adjustment 416, and pH increase adjustment 418 are also coupled to the controller 410 for final adjustment of the combined return stream to a release pH target prior to releasing the combined return stream to the environment. The controller 410 is configured to minimize use of pH adjustment while maintaining the combined return stream at a pH target to avoid any impact on the environment.

Figure 5:
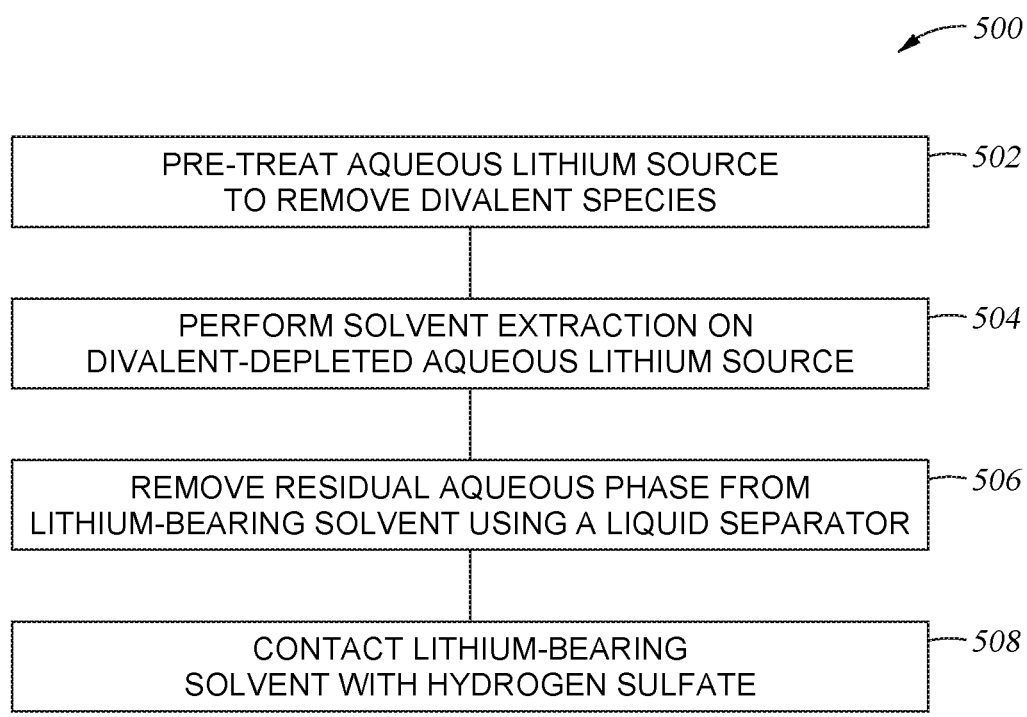
FIG. 5 is a flow diagram summarizing a method according to one embodiment.

FIG. 5 is a flow diagram summarizing a method 500 according to one embodiment. The method 500 is a method of extracting a monovalent metal such as an alkali metal, for example lithium, from an aqueous source such as a salar brine. At 502, the aqueous source is pre-treated to remove any dirt or other extraneous solids, and to remove divalent ions. The divalent ions can be removed by membrane filtration such as reverse osmosis, ion exchange, electrodialysis, nanofiltration, ultrafiltration, or microfiltration. The aqueous source is contacted with a membrane surface that selectively passes monovalent ions and blocks divalent ions. In a lithium example, more than one membrane can be used in series to recover more than 97% of the lithium while rejecting over 95% of divalent ions in the original aqueous source stream. The reject stream from a first membrane filtration unit is routed to a second membrane filtration unit. The permeate streams from the first and second units are combined to recover the monovalent ions in a divalent depleted stream. The reject stream from the second membrane unit is concentrated in divalent ions.

At 504 the divalent depleted stream is subjected to a solvent extraction process to remove monovalent ions such as lithium from the divalent depleted stream. For removing lithium, CYANEX 936®, a solvent that is not miscible with water, but chelates lithium from an aqueous phase, available from Solvay S.A. of Brussels, Belgium, can be used as the solvent. The solvent and the divalent depleted stream are intimately mixed to provide large surface area for ion transport. The intimate mixing is superimposed over a counter-current flow scheme, although co-current flow can also be used. Where counter-current flow is used, the solvent extraction process is performed in an apparatus that can cause intimate mixing of separate liquid phases while supporting a counter-current flow scheme. A pulse column is one example of such apparatus. Another example is a rotary contactor that has blades or arms that rotate within chambers defined by baffles extending radially inward from the walls of the vessel. In either case, a settling zone is provided at the two opposite ends of the contactor to allow settling of the dominant phase at either end. Organic material is recovered at one end of the contactor and aqueous material is recovered at the opposite end of the contactor. The organic material is solvent complexed monovalent ions such as lithium.

At 506, residual aqueous material in the organic stream recovered from the contactor is removed using a liquid separator. The liquid separator is a vessel that allows the organic and aqueous materials to separate into two continuous phases for separate removal. The liquid separator may be a gravity separator that provides a low-shear environment to allow liquid phases to separate by density difference. Alternately, an electrical separator can be used that applies a static or time-varying electric field to the fluid to accelerate separation of the phases. The time-varying electric field may be an AC or AC/DC field, which may vary or modulate according to voltage or amplitude, frequency, waveform, or duty cycle. The time-varying electric field may also be a pulsed or modulated DC field that can vary according to duty cycle, frequency, and modulation voltages. In some cases, a plurality of electrodes can be used to apply power patterns that are the same or different to the fluid. Lithium-bearing solvent separates from lithium-depleted aqueous material. The aqueous material, a lithium-depleted brine is removed and prepared for return to the environment.

Optionally, a weak acid can be added to the organic stream recovered from the contactor before routing the organic stream to an electrical separator. Here, a weak acid is a material having $pK_a$ above zero. The weak acid has correspondingly weak ionic activity that can be influenced by the electric fields applied in an electrical separator. Accordingly, the electric fields can be modulated to promote mixing between the weak acid and the organic stream to promote additional removal of divalent species. In a dehydration scheme for removing residual aqueous material in an organic stream, the amount of weak acid added is typically less than about 10% by volume of the total organic stream with residual aqueous material. The weak acid is added to the organic stream, and mixing is applied by static or motorized means. Residence time can be provided by flowing the mixture through a vessel prior to entering the liquid separator. Temperature can also be adjusted to influence surface behavior and boundary transport at the interfaces between aqueous and organic domains.

At 508, the lithium-bearing solvent is contacted with sulfuric acid to de-complex the lithium. The sulfuric acid may be provided to a stripping column, along with the lithium-bearing solvent, to react together to form lithium sulfate, which may remain in solution, or if sufficiently concentrated, may partially precipitate to form a slurry. A pulse column can once again be used to create intimate mixing in a counter-current flow scheme. Rotary contactors can also be used. In this case, the sulfuric acid is provided as an aqueous solution (i.e. sulfuric acid). In the stripping column the sulfuric acid flows in a first direction while the lithium-bearing solvent flows in a second direction opposite from the first direction. The stripping column enables application of hydraulic pulses to the flowing fluids, and trays within the stripping column create shear when the hydraulic pulses are applied. In another embodiment, the sulfuric acid may be provided in a feed line to a de-complexing vessel. Mixing may be accomplished using in-line mixers such as static mixers and jet mixers. The mixed stream is then provided to a settler, for example a gravity or electrical separator, to allow the lithium sulfate to settle to a lower part of the vessel, and to allow the aqueous and organic phases to separate. The organic phase is, at this time, delithiated. The aqueous phase is a lithium sulfate stream, which may be a solution or slurry.

The lithium sulfate may be converted to lithium hydroxide or lithium carbonate by known processes. Electrolysis can convert lithium sulfate to lithium hydroxide, yielding sulfuric acid in the process. If the lithium sulfate stream is concentrated to the extent of having precipitated lithium sulfate entrained as a slurry, water or lithium hydroxide solution, optionally using recycled lithium hydroxide, can be added to dissolve lithium sulfate and form a lithium sulfate solution. Electric current is then passed through the lithium sulfate solution. Lithium hydroxide can be precipitated during the electrolysis, or membrane electrolysis can be used to maintain separation of acid/base species formed by the electrolytic process. The sulfuric acid produced by the electrolytic process can be recycled to the de-complexing operation.

The brine streams depleted of monovalent ions such as lithium can be returned to the environment if their pH is adjusted to have no impact. The brine stream withdrawn from the liquid separator at 506 can be combined with the reject stream from the second membrane unit of 502. A pH sensor can measure the pH of the combined stream or the individual streams. If the pH is high, an acidic material such as the sulfuric acid recycled from the electrolytic process can be added, while if the pH is low a buffer material can be added, to adjust the pH. If the stream flow rate is measured, a flow rate of pH-adjusting additive can be calculated by known methods. The sulfuric acid stream can be used to lower pH if needed.

Trace organics can be removed from aqueous streams recovered, for example, from the solvent extraction operation or the sulfuric acid contacting operation. The counter-current flow regimes in these two cases, for example the processes where pulse columns are used, can result in some minor trace quantities of entrained or dissolved organic material in the aqueous streams. The aqueous streams can be treated to an organic removal process to prepare the streams for return to the environment or for further processing where presence of organics would be counter-productive.

The lithium-depleted brine stream produced by the solvent extraction process at 504 and the lithium sulfate slurry produced at 508 may contain trace entrained or dissolved organic solvent stemming from use of a pulse column. Each of these streams can be treated to a gas flotation separation process to separate the organic solvent from the aqueous phase. A gas is added to each stream, and the stream is provided to a gas flotation separator. The gas rises, accelerating separation of the organic and aqueous phases. The organic phase is removed from an upper part of the gas flotation separator and the gas is removed, for example in a gas scrubber. Gas flotation can also be performed by reducing the pressure of the aqueous streams to form gas bubbles from dissolved gaseous species. The formed gas bubbles rise, accelerating separation of the organic and aqueous phases.

The lithium extraction apparatus and methods described herein are generally facilitated using sulfate ions. Other anions could be used to facilitate lithium conversions. For example chloride ions, nitrate ions, or acetate ions could be used. Like the sulfate anions, the chloride, nitrate, or acetate ions can be obtained using a strong acid, HCl, $HNO_3$, or $CH_3COOH$, as a de-complexing agent. The different reactivities of these ions will drive use of different conditions in the various apparatus and methods, but the same general process can be performed using these ions as de-complexing agents for the lithium-loaded solvent.

The apparatus and methods described herein are exemplified by lithium solvent extraction. The same apparatus and methods can be used to recover other metals using other solvent extraction solvents. For example, the same apparatus and methods can be used to extract rare earth element using suitable solvents such as CYANEX® 272 or CYANEX 572.

Figure 6A:
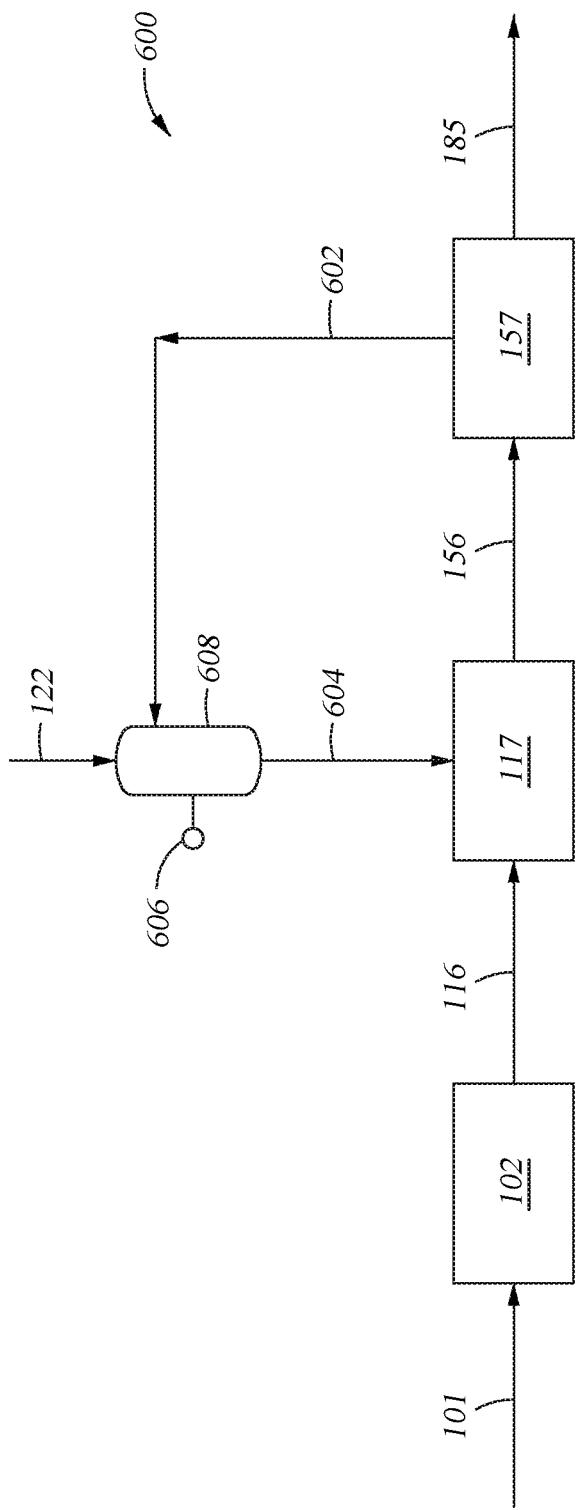
FIGS. 6A and 6B are process diagrams of lithium extraction apparatuses according to two additional embodiments.

In the apparatus and methods described herein, solvent is processed and recycled in a number of instances. Such processing can cause solvent losses over time. FIG. 6A is a process diagram of an apparatus 600 according to another embodiment. The apparatus 600 is similar to the apparatus 100 of FIG. 1, with a solvent make-up system added. Specifically, where solvent recovered in the de-complexing section 157 is routed to the extraction section 117, a recovered solvent stream 610, which may be a mixture of the solvent streams 198, 193, and 180, is routed to a solvent tank 608. Recycle solvent 604 is withdrawn from the solvent tank 608 and provided to the extraction section 117, specifically to the contactor 118. In this case, the solvent stream 122 can be routed to the solvent tank 608 as a make-up stream. A level sensor 606 can be used to control flow rate of the solvent stream 122 to the solvent tank 608 to maintain solvent level in the solvent tank 608. In this way, as solvent is lost through processing, the solvent tank 608 can be used to maintain supply of solvent to the process.

Figure 6B:
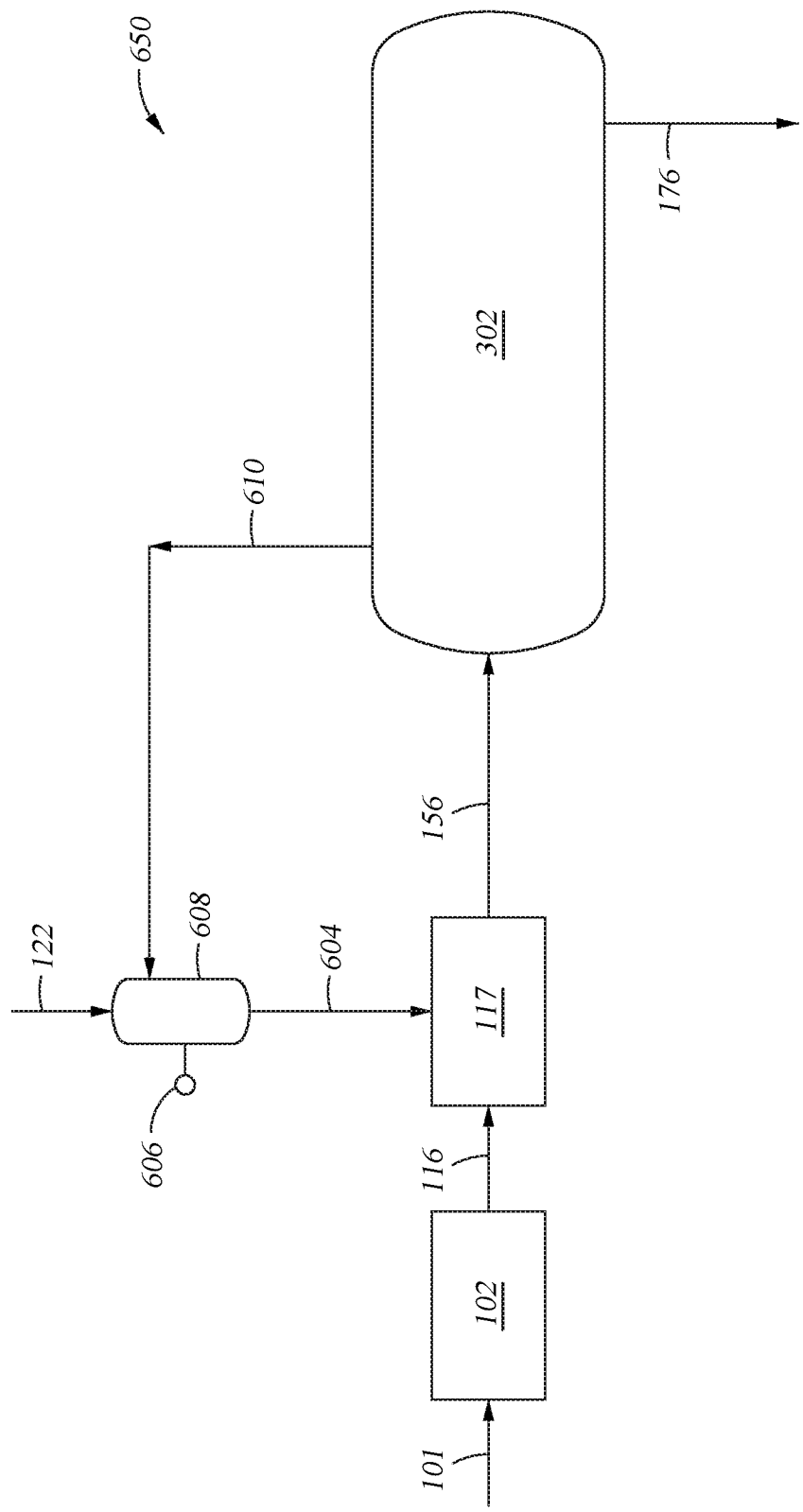

FIG. 6B is a process diagram of an apparatus 650 according to another embodiment. The apparatus 650 is similar to the apparatus 300 of FIG. 3, with the same solvent make-up facilities added as in FIG. 6A. The apparatus of FIGS. 3 and 6 do not include the de-complexing section 157 of FIGS. 1 and 4, using instead an electrical separator to perform the de-complexing. As described in connection with FIG. 3, the electrical separator is used as the extractor 170. This configuration can result in reduced footprint for extraction, since the column and associated equipment are not used.

Figure 7:
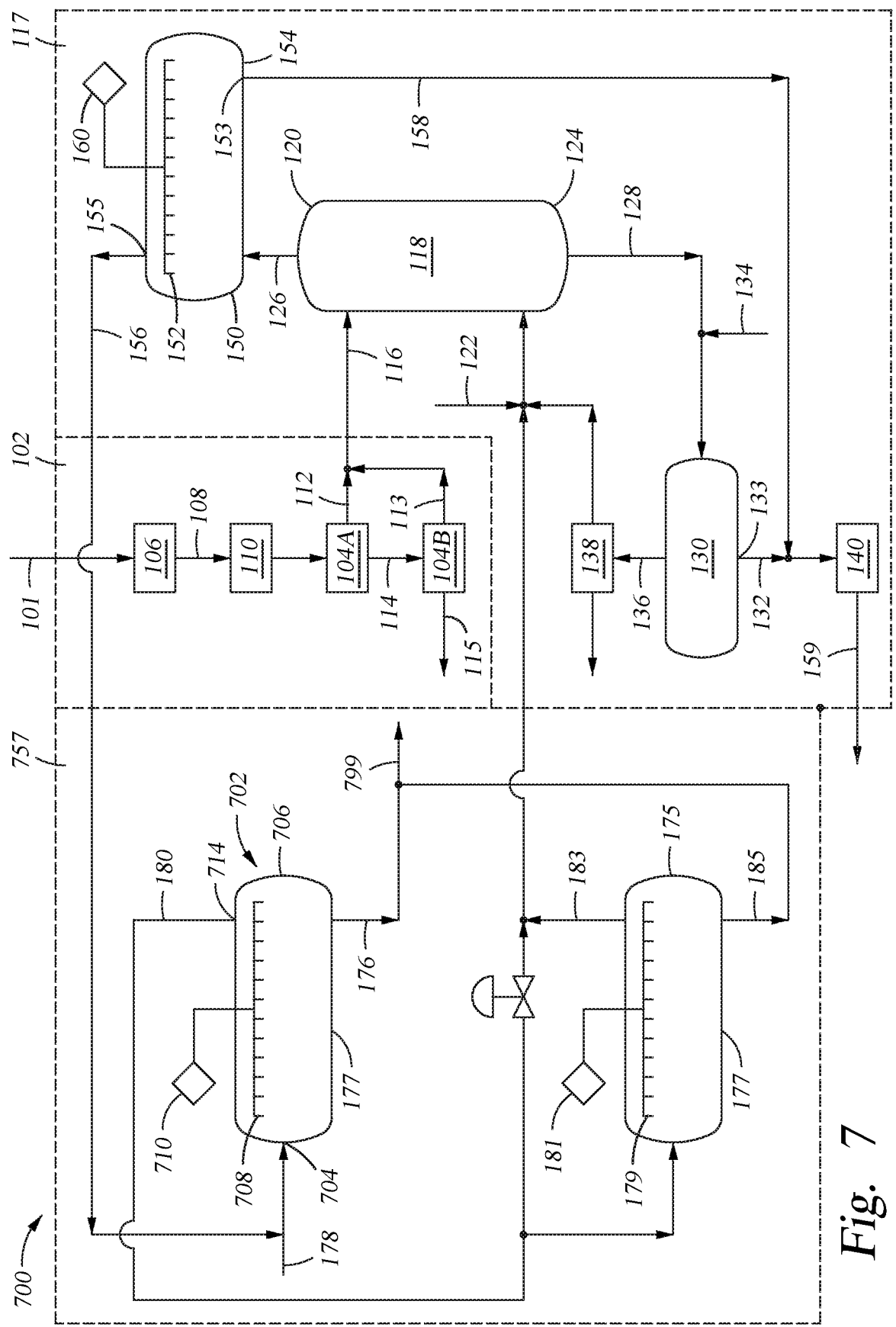
FIG. 7 is a process diagram of a lithium extraction process according to another embodiment.

FIG. 7 is a process diagram of a lithium extraction apparatus 700 according to another embodiment. The lithium extraction apparatus 700 is similar in many respects to the lithium extraction apparatus 100 of FIG. 1. In the apparatus 700, instead of using a counter-current column as the extractor 170, an electrical separator 702 is used as the extractor. Thus, the dehydrated solvent stream 156 from the dehydrator 150 is routed to the electrical separator 702 at an inlet 704 of a vessel 706. The sulfuric acid stream 178 is added to the dehydrated solvent stream 156 upstream of the inlet 704. The sulfuric acid stream 178 and the dehydrated solvent stream 156 may be mixed using any type of static or dynamic mixer. The sulfuric acid decouples lithium from the solvent into an aqueous phase.

An electric field assembly 708 is disposed inside the vessel 706 and coupled to a power unit 710 to create an electric field inside the vessel 706. The electric field may be static or time-varying. The electric field aids in separating the aqueous phase bearing lithium sulfate from the organic phase containing delithiated solvent. The organic phase settles upward in the vessel 706, while the aqueous lithium-bearing phase settles downward. The electric field may be controlled, adjusted, and/or modulated according to voltage, frequency, waveform, duty cycle, modulation frequency, and any other pattern to optimize separation of the aqueous phase from the organic phase, as described elsewhere herein.

Multiple electric field assemblies can be used to apply more than one electric field inside the vessel to provide spatial or temporal diversity to the electric field and increase separation of the aqueous and organic phases. The multiple electric fields may be located at different regions of the interior of the vessel 706 to provide different electric field stimuli to different areas of the vessel 706. For example, an interface zone can be defined in a central area of the interior of the vessel 706, the central area being defined with reference to a lateral dimension of the vessel 706, which is generally perpendicular to a longitudinal dimension of the vessel 706. Thus, the central area is a laterally central area that can extend the full length of the vessel along the longitudinal dimension. A first electric field assembly can be located in the interface zone to apply a first electric field to the interface zone designed to accelerate large domain liquids separation in the interface zone, while a second electric field assembly is located in an organic zone of the vessel 706 to apply a second electric field to the organic zone designed to accelerate small domain liquids separation in the organic zone. The first and second electric field assemblies would have first and second power units to apply different electrical drives to the first and second electric field assemblies, which may be different according to any or all of amplitude, frequency, duty cycle, waveform, modulation frequency, and modulation amplitude.

The unloaded solvent stream 180 containing delithiated solvent is removed at a first outlet 714 of the vessel 706. The aqueous lithium sulfate stream 176 is removed from a second outlet 716 of the vessel 706. The unloaded solvent stream 180 may be directly recycled to the extraction section 117, or the optional separator 175 can be used to refine the unloaded solvent stream 180, removing aqueous contaminants from the unloaded solvent stream before the solvent is recycled to the extraction section 117. When the separator 175 is used, the separator 175 may be an electrical separator, a gravity separator, a rotational separator, or other liquid-liquid physical separator. Sulfuric acid can be added to the separator 175 for a second stage of extraction, if desired. The dehydrated unloaded solvent stream 183 is removed from the separator 175 and recycled to the extraction section 117, potentially mixed with the unloaded solvent stream 180 from the vessel 706 using any convenient mixer.

The aqueous stream 185 is removed from the separation 175, and may be combined with the aqueous lithium sulfate stream 176 to form a clean lithium sulfate stream 799, which may be a slurry of lithium sulfate solids in an aqueous medium, like the clean lithium slurry stream 199.

In FIG. 7, the loaded solvent stream 126 leaving the contactor 118 is transformed to the dehydrated solvent stream 156 in the separator 150 before being delithiated in the electrical separator 702. In alternate embodiments, the sulfuric acid stream 178 could be added to the loaded solvent stream 126, and lithium decoupling performed in the separator 150. In such embodiments, the electrical separator 702 could be omitted, or could be used as a dehydrator to remove trace aqueous components from the unloaded solvent. Thus, in such cases, solvent from lithium decoupling can be recycled from the separator 150 to the extractor 118, or from the separator 702 to the extractor 118 depending on the configuration chosen. In such an embodiment, where three electrical separators are shown in FIG. 7, only one or two might be used. Where sulfuric acid is used with separator 150, separator 702, and separator 175, the sulfuric acid may be obtained, in part or in whole, by recycling sulfuric acid from downstream lithium recovery units, as described above. Whether to use one, two, or three electrical separators for a lithium separation apparatus generally depends on the quality of separation desired between the organic and aqueous phases, and indirectly on the scale of the lithium processing to be performed by the apparatus. Larger scale plants may benefit from using more separators to counteract the reduction in residence time and contacting time resulting from high volumetric flow rates, and vice versa.

While the foregoing is directed to embodiments, other and further embodiments of the present disclosure may be devised without departing from the basic scope thereof, and the scope thereof is determined by the claims that follow.

What is claimed is:

1. A method of recovering alkali metals from an aqueous source, comprising:
   removing divalent ions from the aqueous source by subjecting the aqueous source to a first membrane filtration process that produces a first permeate stream and a reject stream, routing the reject stream to a second membrane filtration process that produces a second permeate stream and a concentrated divalent stream, and combining the first and second permeate streams to produce a divalent depleted stream;
   contacting the divalent depleted stream with an organic solvent that complexes alkali metals and recovering an alkali metal loaded solvent stream and a depleted brine stream; and
   de-complexing the alkali metal loaded solvent of the loaded solvent stream in the presence of a time-varying electric field to form an aqueous stream and an unloaded solvent stream.

2. The method of claim 1, further comprising electrically dehydrating the loaded alkali metal solvent stream prior to the de-complexing.

3. The method of claim 1, further comprising performing a gas flotation separation process on the depleted brine stream.

4. The method of claim 1, further comprising performing a gas flotation separation process on the aqueous stream.

5. The method of claim 1, further comprising pH adjusting the concentrated divalent stream and the depleted brine stream.

6. The method of claim 1, further comprising electrically dehydrating the unloaded solvent stream.

7. The method of claim 1, wherein each of the first and second membrane filtration process uses a membrane separator, wherein the membrane separator includes one or more of a microfiltration, ultrafiltration, nanofiltration, and reverse osmosis units.

8. The method of claim 1, wherein it comprises subjecting a feed stream to a filtration process to remove undissolved solids from the feed stream, wherein the aqueous source is obtained from the filtered feed stream.

9. The method of claim 1, wherein each of the first and second membrane filtration process uses a membrane separator, wherein at least one of the first and second membrane process includes applying an electric field to said membrane separator.

10. The method of claim 1, wherein contacting the divalent depleted stream with an organic solvent includes a counter-current liquid extraction process.

11. The method of claim 1, wherein contacting the divalent depleted stream with an organic solvent uses a contactor to contact the divalent depleted stream and the organic solvent, wherein the contactor is one of a high-shear vessel, a pulse column, or a rotary contactor.

12. The method of claim 1, wherein de-complexing the alkali metal loaded solvent includes contacting the loaded solvent stream with sulfuric acid in an extractor to produce a lithium sulfate stream.

13. The method of claim 12, wherein contacting the solvent stream with sulfuric acid includes flowing the loaded solvent stream and sulfuric acid counter-current.

14. The method of claim 6, further comprising dehydrating the alkali metal loaded solvent before de-complexing the alkali metal loaded solvent.

15. The method of claim 1, wherein the aqueous stream is an aqueous lithium sulfate stream.

* * * * *